(12) United States Patent
Beauvois

(10) Patent No.: US 6,556,671 B1
(45) Date of Patent: Apr. 29, 2003

(54) FUZZY-LOGIC ROUTING SYSTEM FOR CALL ROUTING WITH-IN COMMUNICATION CENTERS AND IN OTHER TELEPHONY ENVIRONMENTS

(75) Inventor: Alexandre Beauvois, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 16 days.

(21) Appl. No.: 09/587,091

(22) Filed: May 31, 2000

(51) Int. Cl.[7] .......................... H04M 3/00; H04L 12/66
(52) U.S. Cl. ................... 379/265.02; 370/352
(58) Field of Search ................ 379/265.01, 265.02, 379/266.01–266.16, 309, 221.06; 370/351, 352, 355

(56) References Cited

U.S. PATENT DOCUMENTS

| | | | | |
|---|---|---|---|---|
| 5,155,763 A | * | 10/1992 | Bigus et al. | 379/266 |
| 5,754,945 A | * | 5/1998 | Lin et al. | 455/436 |
| 5,825,869 A | * | 10/1998 | Brooks et al. | 379/265.12 |
| 6,058,435 A | * | 5/2000 | Sassin et al. | 379/265 |
| 6,070,160 A | * | 5/2000 | Geary | 707/4 |
| 6,078,946 A | * | 6/2000 | Johnson | 709/200 |
| 6,081,518 A | * | 6/2000 | Bowman-Amuah | 370/352 |
| 6,173,053 B1 | * | 1/2001 | Bogart et al. | 379/265 |
| 6,202,059 B1 | * | 3/2001 | Thompson et al. | 706/46 |
| 6,222,919 B1 | * | 4/2001 | Hollatz et al. | 379/266 |
| 6,230,197 B1 | * | 5/2001 | Beck et al. | 379/265 |
| 6,236,365 B1 | * | 5/2001 | LeBlanc et al. | 342/450 |
| 6,289,331 B1 | * | 9/2001 | Pedersen et al. | 701/27 |

OTHER PUBLICATIONS

Neural Fuzzy Agents that Learn Profiles and Search Databases, IEEE, Sanya Mitaim and Bart Kosko, 1997, pp. 467–472.*

* cited by examiner

*Primary Examiner*—Benny Q. Tieu
(74) *Attorney, Agent, or Firm*—Donald R. Boys; Central Coast Patent Agency, Inc.

(57) ABSTRACT

A fuzzy-logic routing system is provided for routing communications events to agents working in a telephony environment. The routing system uses parsed input taken from communications events upon arrival of those events to a telephony switch or IP data router to create needs expressions, which reflect the intended purposes of originators of the communications events. The system, using the needs expressions, performs a data search in a repository containing capabilities expressions, which reflect capabilities of service agents and/or automated systems responsible for handling the communications events. Upon suitably matching a needs expression with a capabilities expression, the system then routes the associated communications event to the associated agent. The system may be integrated to CTI telephony systems, data network telephony systems, or a combination thereof.

22 Claims, 2 Drawing Sheets

FUZZY-LOGIC ROUTING SYSTEM FOR CALL ROUTING WITH-IN COMMUNICATION CENTERS AND IN OTHER TELEPHONY ENVIRONMENTS

FIELD OF THE INVENTION

The present invention is in the field of CTI telephony including data network telephony (DNT) communication and pertains more particularly to methods and apparatus for routing incoming communication events.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994. This document is incorporated herein by reference.

At the time of filing the present patent application there continues to be remarkable growth in telephone routing systems, with routing done both at or near point-of origin of incoming calls, and at call destinations. For example, systems are known to the present inventor that perform initial call processing before routing an incoming call to a destination switch, and further routing is done at the call destination in computerized telephony equipment, often termed customer premises equipment (CPE). The present invention pertains most particularly to routing at customer premises.

There is, at the time of the present patent application, a considerable range of CPE systems available for use from various manufacturers, and, as state-of-the-art routing systems are typically computerized, there is a broad variety of software available for such systems as well. It is the software in general wherein routing rules are set, and the routing rules determine the decision-making paths a system follows in routing calls.

A large technical support operation serves as a good example in this specification of the kind of applications of telephone equipment and functions to which the present inventions pertain and apply, and a technical support organization may be used from time to time in the current specification for example purposes. Such a technical support system, as well as other such systems, typically has a country wide or even a world wide matrix of call centers for serving customer's needs. Such call center operations are more and more a common practice to provide redundancy and decentralization.

In a call center, a relatively large number of agents typically handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or a Public Access Branch Exchange (PABX). Each agent also typically has access to a computer platform having a video display unit (PC/VDU).

In addition to CTI communications centers, DNT capability including Internet Protocol (IP) communication has been introduced and successfully integrated into the telephony environment. In current art, it is not uncommon to have a CTI-enhanced call center that also practices Internet Protocol Telephony (IPT). With added capability and expanded media options, the term communication center now more appropriately describes the call-in center.

At the time of the present patent application intelligent telephony networks and IP networks share infrastructure to some extent, and computer equipment added to telephony systems for computer-telephony integration (CTI) are also capable of Internet connection and interaction. Therefore, there is often no clear distinction as to what part of a network is conventional telephony, and what part is IPT.

In conventional telephony systems, such as public-switched telephony networks (PSTNs), there are computerized service control points (SCPs) that provide central routing intelligence (hence the term intelligent network). Internet Protocol Networks (IPNs) do not have a centralized routing intelligence, such as a SCP. IPNs, however, have multiple Domain Name Servers (DNS), whose purpose is somewhat similar to that of routers in intelligent networks, which is to control the routing of traffic. Instead of telephony switches (PBXs), IP switches or IP routers are used.

Further to the above, IPT systems at the time of the present patent application are much less sophisticated than are CTI systems in provision of intelligent routing, parallel data transfer, supplemental data provision to agents, and the like. The advantages that embodiments of the invention described below bring to conventional telephony systems may also in most cases be provided to IPT systems and systems in which the form of the network between conventional telephony and IP protocol is blurred.

Telephony routing systems typically rely in part on customer identification, call-destination information, and call origination information to aid in routing. In standard telephony service such information, with the exception of caller identity, is typically provided as part of the service through such as caller line identity (CLID), automatic number identification service (ANIS), destination number identification service (DNIS), and so on. These protocols are well developed in standard telephony services, but are not well defined in DNT systems. Often, identification of a customer (actual person making the call) must be solicited at the time of the call.

One protocol developed to aid wireless communication in telephony is the Wireless Application Protocol (WAP). The WAP protocol simplifies communication between wireless devices operating on a given network. WAP compliant devices are typically personalized devices which must have an assigned address and which must be authenticated on a network before use. Therefore, caller identification is a standard part of placing a call from a device that requires authentication to operate on a given network.

In prior art systems, routing protocol is typically institutionalized within a communications center using applicable software. Although there are widely varying systems in the art for creating and implementing routing rules, all such systems exhibit a common drawback. That is to say that once set up (programmed) to follow certain routing rules and practices, such rules cannot easily vary, and individual users or groups of users, cannot easily change or modify the rules.

In all telephony environments callers seeking service from a communications center do not always fit into defined categories that may be covered by existing rigid routing rules. Perhaps a caller has more than one objective when calling a communications center. Perhaps a caller requests a service that could be performed, but is not defined as an task within the center. Flexible routing routines and error routing routines are developed to handle such situations. However, such routines often dispose of callers in ways that the callers themselves do not expect or desire. One example, would be continually routing an individual back to an IVR menu because he or she wants to accomplish a goal that is not specifically defined with specific routing options made available to the caller when placing the call.

A degree of routing flexibility has more recently been achieved in more advanced intelligent systems known to the inventor through introduction of various "flexible" routing techniques. Among these are skill-based routing, predictive routing, priority routing, statistical routing, virtual queuing, and even knowledge-based routing. These routing techniques are known to the inventor, may be implemented in combination, and are typically server-controlled and executed. In some applications, these flexible rules may be changed for special cases at the time of or before a call reach a final destination. In this way, even more flexibility in routing may be achieved. In some of these systems known to the inventor, profiles are developed for repeat callers so that identification is more complete and special routing routines may be developed and executed based on profiled histories.

Even with all of the above-described improvements in routing techniques, there is still a measure of rigidity inherent with a rules-based routing system of any sort. That is to say that the actual rules are designed to accommodate certain known situations that take into account known parameters. Invariably, routing rules are set in place to handle predicted situations. Changing the rules, while not impossible, usually requires that someone having applicable skills in the art spend time and effort in order to effect any changes either before or at the time of a call.

What is clearly needed is a routing system that does not depend on pre-existing knowledge about callers or defined call situations that rigidly invoke specific call-handling routines. Such a system would offer a communications center the greatest degree available in routing flexibility and provide callers with an even more personalized and interactive service.

SUMMARY OF THE INVENTION

According to a preferred embodiment of the present invention, a computerized routing system for routing communications events to final destinations is provided. The system includes a communications routing apparatus for receiving and routing the communications events and a system-client interface for accepting input upon arrival of the events to the communications routing apparatus. The system also includes a data repository for storing data related to at least one communications agent, and a software application for performing a data search in the data repository using the input taken from the communications events and determining routing destinations for the communications events based on the results of the data search.

In one aspect of the present invention, the system is adapted to a CTI-telephony environment wherein at least one of the communications events is a telephone call, at least one of the communications agents is a service representative, and the routing apparatus is a telephony switch. In this aspect, the routing performed by the system takes place within a telephony communications center.

In another aspect of the present invention, the system is adapted to a data-network telephony environment wherein at least one of the communications events is an IP voice call, at least one of the communications agents is a service representative, and the routing apparatus is an IP data router. In this aspect, the routing performed by the system takes place within a telephony communications center enhanced with DNT capabilities and equipment.

In both of the above-described aspects, the communications events may be of forms other than voice calls such as e-mails, faxes, instant messages, or other known forms. In still another aspect the system is adapted for wireless communication wherein the medium of communication is a wireless data network.

In still another aspect of the present invention the system is adapted to a personal routing environment wherein the routing apparatus is a personal router dedicated either in whole or in part to serving one communications agent having multiple destination numbers. In this aspect of the present invention, the routing apparatus is part of a telephony service subscribed to by the communications agent. Alternatively, the routing apparatus is a personal IP data router maintained by the agent.

In preferred embodiments of the present invention, a software application for determining routing destinations for communications events is provided. The software application includes a parsing module for parsing input from a communications event, a data-search module for searching a data repository using the parsed input, and an optimization module for optimizing the results of the data search and selecting a routing destination from the optimized data. In one embodiment, the input is solicited through an interactive voice response capability. Also in one embodiment the interactive voice response capability is enhanced with voice recognition capability.

In some aspects of the present invention the communications events are text based and the parsing module parses text from the events. In other aspects, the communications events are voice calls and the parsing module parses keywords and phrases from solicited voice input. In a preferred embodiment the optimization module optimizes the data according to data-match percentage values. And in some aspects of a preferred embodiment the data-search module searches more than one designated data repository for matching data.

In yet another aspect of the present invention, a method for routing communications events to communications agents is provided. The method includes the steps of obtaining input data from the communications events, and then parsing the obtained data for keywords and phrases. A data search is then performed in a data repository using the parsed keywords and phrases obtained from the input data. The search results are then optimized according to data match percentage values, and a routing destination is determined from the optimized data. Communications events are then routed to the selected routing destinations.

In preferred embodiments, the method is practiced in a CTI telephony environment that is enhanced with data-network-telephony capability including IP telephony. Through practicing the present invention, communications events may be routed to best matching service agents in a communication center and other telephony environments without depending on rigid rules-based routing conventions as will be taught below.

BRIEF DESCRIPTION OF THE DRAWING FIGURES

DESCRIPTION OF THE PREFERRED EMBODIMENTS

Figure 1:
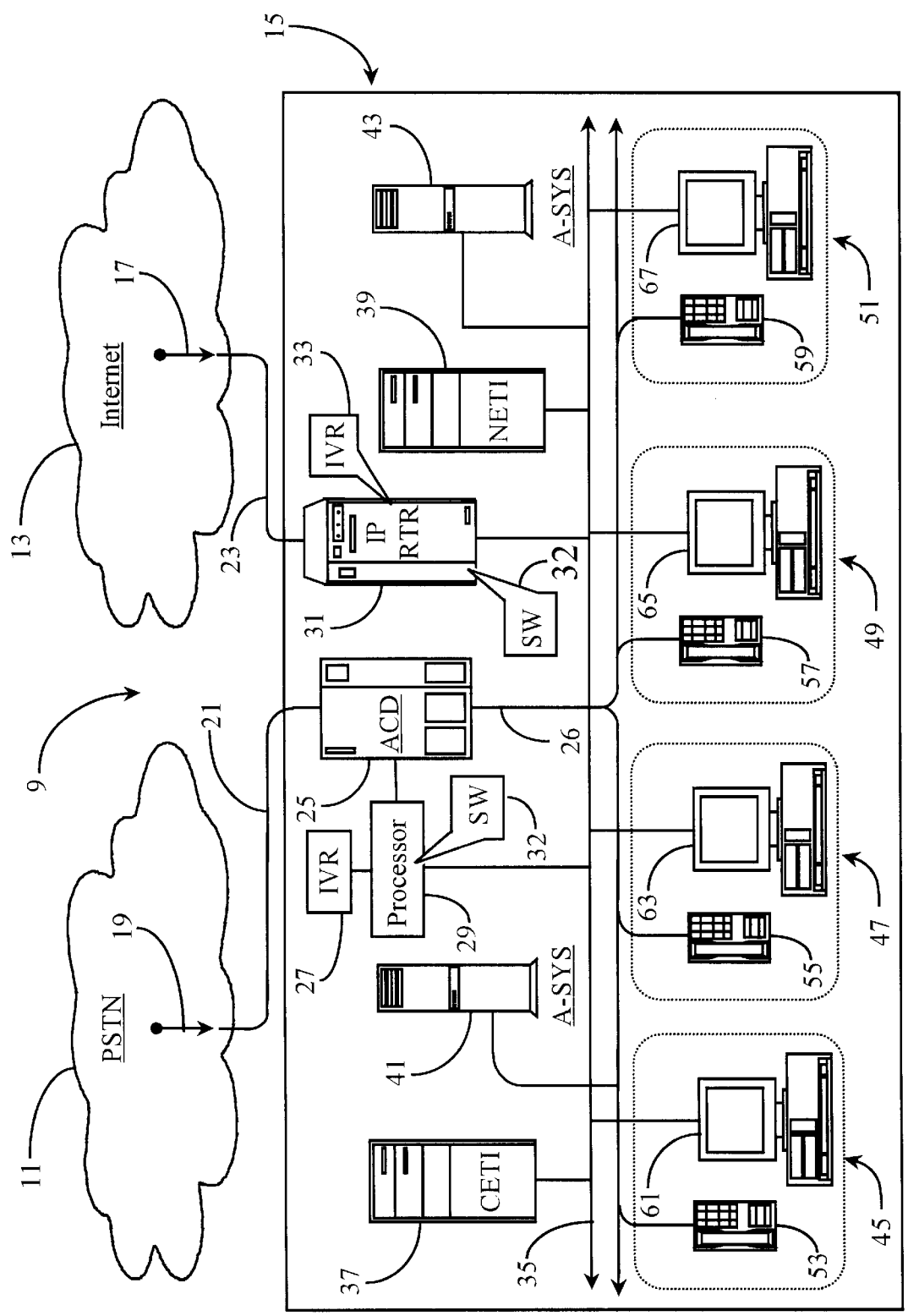
FIG. 1 is a network-diagram illustrating a communication center enhanced with a fuzzy-logic routing intelligence according to an embodiment of the present invention.

FIG. 1 is a network-diagram illustrating a communication center 15 enhanced with a fuzzy-logic routing intelligence (SW 32) according to an embodiment of the present invention. An exemplary communications network 9 is illustrated for the purpose of describing the present invention. Network 9 comprises a PSTN network 11, the well known Internet network 13 and communication center 15.

PSTN 11 is intended to exemplify a connection-oriented-switched-telephony (COST) network as known in the art of telecommunications. PSTN 11 may also be of the form of a private or corporate telephony network without departing from the spirit and scope of the present invention. The inventor chooses PSTN as an example because of the high public access characteristic. PSTN 11 may be assumed to contain all of the equipment and lines necessary for facilitating telephony as known in the art, much of which was described in the background section. SCPs, routers, telephony switches, network gateways, and the like are included in equipment known to exist in network 11. Also as described in the background section, CTI enhancement for intelligent routing purposes may be provided at network level within PSTN 11. A vector 19 illustrates calls, which are destined for exemplary communication center 15, originating from anywhere in PSTN 11. The skilled artisan will recognize that center 15 is meant to represent any of a very large number of call destinations.

Internet 13 represents the most publicly accessible Wide-Area-Network (WAN) known and is chosen by the inventor as an example for that reason. Alternatively, Internet 13 may, instead of an Internet network, be a private or corporate WAN, an Intranet, an ethernet, or any other data-packet-network (DPN) enhanced for IP communication. Internet 11 may be assumed to contain all of the known equipment necessary for facilitating Internet communication including DNT of which IPNT is a sub-set. Such equipment includes data routers, domain servers, network gateways, WEB servers, Internet Service Providers (ISPs) and the like. A vector 17 represents communication events originating from anywhere in Internet 13 that are destined to exemplary communications center 15.

Communication center 15 represents a dually-capable center able to receive incoming communication events from PSTN 11 in the form of COST events, and from Internet 13 in the form of DNT events. COST events 19 arriving into communication center 15 are received in this embodiment at a central telephony switch 25 by way of a telephony trunk 21. In this example, switch 25 happens to be an automatic call distributor (ACD), however other types of telephony switches may be substituted therfor. DNT events 17 arriving into communication center are received at an IP router 31 by way of an Internet access line 23. The configuration and connection means described above are known in the art and it will be appreciated that there are other possibilities pertaining to how center 15 may receive incoming communication events from network level.

Inside communication center 15, events 19 and 17 are routed to agents working at stations adapted to receive the events. For example, there are four agent stations illustrated in this embodiment. These are agent stations 45, 47, 49, and 51. The skilled artisan will recognize that there may be many more than these four stations. In this example, each agent station is equipped with a COST telephone for handling COST events. These are telephones 53, 55, 57, and 59 respectively. Cost telephones 53–59 are connected to central switch 25 by an internal telephone wiring 26.

Each agent station 45–51 is also equipped with a personal computer having a video display unit (PC/VDU). These are PC/VDUs 61, 63, 65, and 67 respectively. Each PC/VDU 61–67 is connected to a local-area-network (LAN) 35 within center 15. LAN 35 is capable as a data-packet-network (DPN), which is enhanced for transfer control protocol/Internet protocol (TCP/IP) communication in this embodiment as well as for other known Internet protocols as may deemed appropriate for facilitating routed events 17. PC/VDUs 61–67 are utilized for receiving DNT events 17. IP router 31 is connected to LAN 35 for the purpose of routing IP events over LAN 35 to target PC/VDUs 61–67.

In an alternative embodiment, telephones 53–59 may also be adapted to handle IP telephony. In this case, they would either be connected to respective PC/VDUs within their stations, or be LAN connected. It will be appreciated that there are many possibilities for integrated telephony. The inventor chooses to illustrate separate communication capabilities with respect to telephones 53–59 and PC/VDUs 61–67 for exemplary purpose only, therefore the configurations represented herein should not be construed as limiting in any way.

Telephony switch 25 is CTI-enhanced by a connected processor 29, and by an intelligent peripheral 27, which operates as an interactive voice response/recognition unit (IVR). IVR 27 is enhanced for practice of the present invention. Software (SW) 32 of the present invention is provided to reside and execute on processor 29. SW 32 provides enhancement to switch 25 and IVR unit 27 according to a preferred embodiment of the present invention, described more fully below.

IP router 31 contains it's own processor (not shown). An IVR capability (software) is provided to reside and execute on IP router 31. SW 32 running on IP router 31 enhances IVR 33 for practicing the present invention. Similar to IVR 27, IVR 33 has voice response and recognition capabilities. Enhancements provided by SW 32 in processor 29 and by SW 32 in IP router 31 are described further below.

It is a goal of the present invention to provide intelligent routing capability to communication center 15 without depending on rigid, rules-based routing routines. A means for accomplishing this goal is provided using fuzzy logic. In this aspect, the inventor provides a unique configuration of software tools, which are adapted to create expressions that describe client needs when calling center 15 and agent capabilities for handling the client needs. For example, a Capability Expressions Tools Interface (CETI) repository 37 is provided and connected to LAN 35. CETI repository 37 contains records of all of capabilities of communication center 15 regarding capabilities of agents and automated systems created through Capability Expressions Tools (CETs). Broadly speaking, capabilities are defined as what services are provided at what levels by which agents and systems. Therefore, agents working at stations 45–51 along with automated systems have data sections reserved for them wherein all of their specific parameters are listed. A set of such parameters is defined by the inventor as a capabilities expression of a particular agent or automated system.

Automated systems (A-SYS) are illustrated herein as A-SYS 41, which is responsible for COST automated systems, and A-SYS 43, which is responsible for DNT automated systems. A-SYS 41 is connected to telephony wiring 26 and represents capabilities such as automated call-backs, automated faxes, automated voice messaging, and so on. A-SYS 43 is connected to LAN 35 and represents capabilities such as automated e-mails, automated computer faxes, automated file shares, instant message alerts, and so on.

A-SYS 41 may be activated in this example, from any of telephones 53–59, or from processor 29. A-SYS 43 may be activated from any of PC/VDUs 61–67, or from IP router 31. In some embodiments, A-SYS 41 may be activated from any LAN-connected node. Capabilities of both A-SYS 41 and A-SYS 43 are stored in CETI 37 along with agent capabilities expressions as described above.

A second repository termed a needs-expression-tool-interface (NETI) 39 is provided and connected to LAN 35. NETI 39 contains expressions specific to client needs that have been stored after successful client/agent interactions. In this example, SW 32 instances running on processor 29 and on IP router 31 work with information held in CETI 37 and in NETI 39 to provide clients with a best match to an agent based on their specific needs when calling into center 15. In this example, SW 32 may be assumed to be a set of Needs Expression Tools (NET).

In practice of the present invention, clients calling into center 15, represented herein by vectors 19 (COST) and 17 (DNT), are provided with a unique IVR greeting by way of IVR 27 (COST) and IVR 33 (DNT). The greeting, in one embodiment, may simply ask the client what the nature of his or her business is with center 15 for that particular call. In prior art systems, an IVR greeting would instead solicit a customer response to a list of rigid options to which routing rules apply.

SW 32 instances illustrated herein enable IVR 27 and IVR 33 to recognize and parse natural language spoken by a customer. Parsed sections are termed needs expressions by the inventor. IVR functionality provided by SW 32 of the present invention may be described as a needs expression tool (NET) for creating needs expressions or instant profiles. Other tools may qualify as needs expression tools. For example, a fax sent in by a customer may be scanned and parsed by a text parser. This system would become a NET for creating instant profiles from a fax or other text communication. There are many such possibilities.

Agents working at stations 45–51 are profiled with capabilities expression tools (CET) as described above. Using such tools, profiles or capabilities expressions are created that describe agent parameters and service capabilities. CETs may be utilized by a system administrator (not shown) to create agent profiles that are stored in CETI 37 on behalf of all agents assigned to or working at center 15. Similarly, automated system CETs are created and stored by an administrator or other knowledge worker. CETs may be of the form of interactive applications partially filled out by agents themselves and edited or modified by administrative personnel. In one embodiment, a CET incorporates current agent status in periodic or real-time updates such that his or her profile stored in CETI 37 may change as the agent's state changes during an active work period.

NETs, created through customer interaction, are used to search CETI 37 for best matching capabilities expressions in order to determine where to internally route the customer. In this way the disparity between a customer profile (what a customer wants) and an agent profile (what an agent can do) may be substantially reduced. Routing based on fuzzy logic may be applied without rigid routing rules or routines. In another embodiment, fuzzy logic routine may be practiced in conjunction with certain routing routines in order to provide overriding flexibility to a rules-based routing system as a whole.

It will be apparent to one with skill in the art that the method and apparatus of the present invention may be practiced in a variety of different ways for different types of communication media without departing from the spirit and scope of the present invention. The preferred embodiment illustrated herein focuses on creating needs expressions from customer voice interactions using enhanced IVR and natural language parsing capability as a NET. Both COST and IP voice calls are handled in essentially the same manner. Applicable NETs may be created for e-mails, faxes, letters, file requests, and other forms of communication.

It will also be apparent to one with skill in the art that CETs may be developed that incorporate real-time information without departing from the spirit and scope of the present invention. For example, an interactive software application (not shown) may be created that agents may interact with in order to input profile information. Profile information would include basic skills, languages spoken, expertise in lesser known areas, and so on. Administrators or supervisors may then add to or refine the created profiles. While CETs are being held in CETI 37, they may be updated periodically to reflect current assignment, availability, newly acquired skills, and so on.

In an alternative embodiment, agents do not create their own profiles but have them created on their behalf by knowledge workers familiar with the agents skills and training. There are many possibilities. More detail about a fuzzy logic routing process is provided below.

Figure 2:
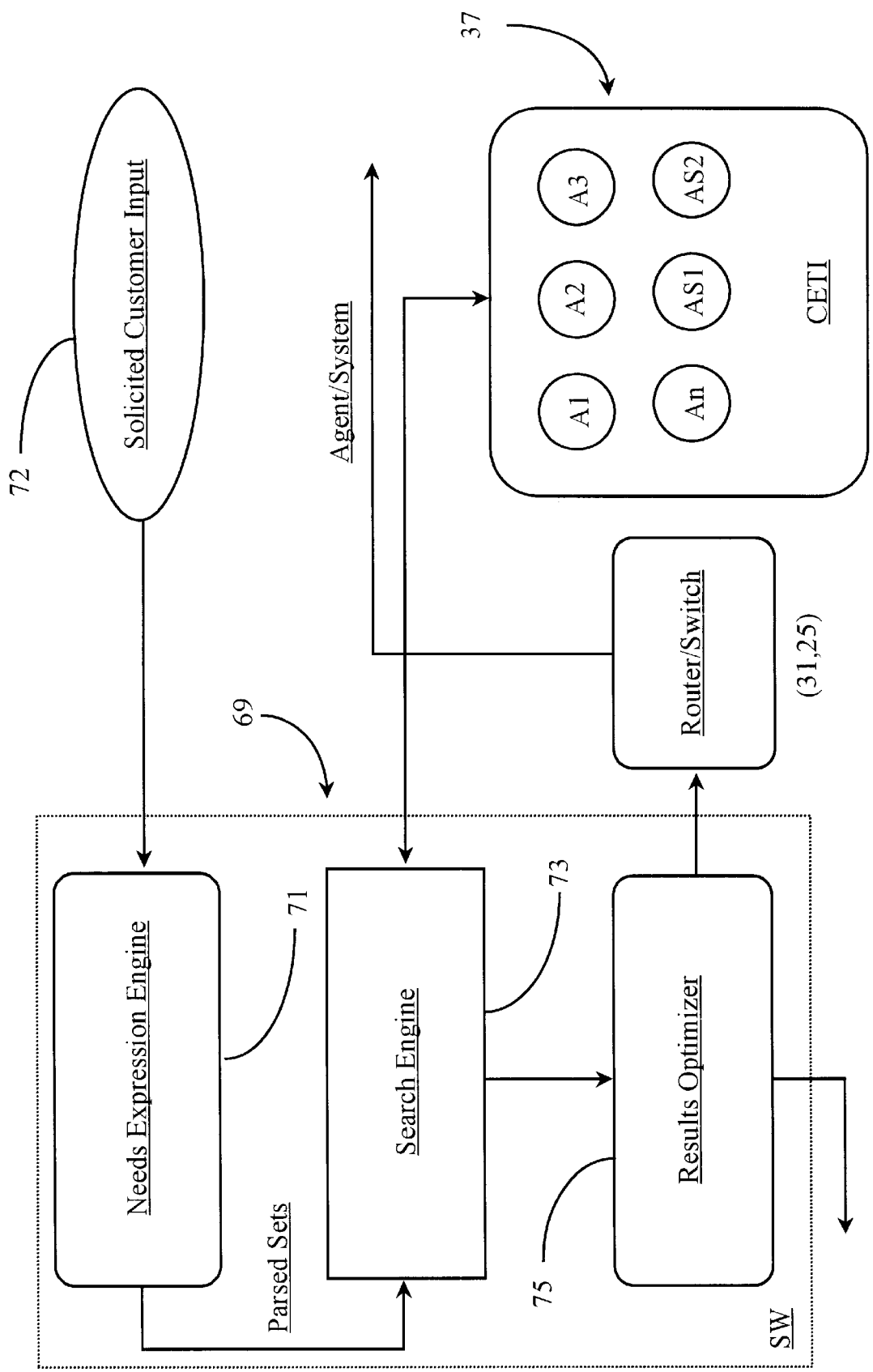
FIG. 2 is a block diagram illustrating a fuzzy-logic routing process according to a preferred embodiment of the present invention.

FIG. 2 is a block diagram illustrating a fuzzy-logic routing process according to a preferred embodiment of the present invention. Software (SW) 69 illustrated herein may, in one embodiment, be analogous to SW 32 illustrated in FIG. 1 running on processor 29 and on IP router 31. This would, of course be in an embodiment exemplifying COST and IP voice callers whom are first interacted with by IVR. However, in another embodiment, SW 69 may be adapted to work with e-mails, faxes, and other communication forms as previously described.

In order to create a needs expression for one COST or DNT interaction, SW 69 must receive a solicited customer input 72. Input 72 may be of the form of an IVR interaction, an interactive text form (DNT), or another medium wherein the customer is first prompted for the nature of his or her request. Input 72 may be of the form of a natural language request, however coded input may also be utilized in some applications. In the example of FIG. 1, the solicitation is accomplished through IVR functionality. In an alternate application such as e-mail, solicitation may not be required, as an e-mail destined to communication center 15 will likely already contain a request that may be parsed and understood.

In the case of IVR functionality, voice recognition is utilized to analyze input 72. This occurs within a needs expression engine (NEE) 71, which is a part of SW 69. NEE 71 is adapted to parse certain portions of input 72 for useful information. Nouns, verbs, part numbers, product titles, adjectives and so on may be recognized by NEE 71 and organized into parsed sets. Using a natural language parsing engine in conjunction with voice recognition software allows NEE to create parsed sets which reflect the customers own words (needs expression). Additional information tagged to each parsed set would identify the caller or originator of input 72 according to methods used in rules-based routing. Parsed sets, also termed needs expressions, are then used as input for a search engine 73 as illustrated by the directional arrow labeled parsed sets.

Search engine 73 searches CETI repository 37 for matching capabilities expressions associated with agents, illustrated therein as objects A1–An, and automated systems, illustrated therein as AS1 and AS2. This data search is illustrated herein by the double arrow connecting search engine 73 to CETI 37. Capabilities expressions are identified in CETI 37 according to agent/system ID, agent/system current status, agent/system current availability factor, and so on. Therefore, engine 73 may be adapted to ignore matching data from the capabilities expressions of agents or systems that are unavailable for routing because of one reason or another.

Matching data information is collected by engine 73 and passed to a results optimizer 75. Optimizer 75 organizes returned data according to matched percentages. For example, a percentage threshold may be applied to engine 75, which causes only matches at 100% down to 90% be utilized and then only the top three within that range. The top three CETI matches may be used as a first, second, and third priority routing destinations.

In one embodiment of the present invention, synonyms to keywords contained in a needs expression may be utilized in a CETI search performed by engine 73. For example, if a needs expression reads desire, check, stock, and portfolio, a matching capabilities expression may contain the words quotes, broker, portfolio organization, licensed trader. Note the terms quote, broker, and trader do not match semantically with the parsed set or needs expression. However, the latter terms may be considered synonyms of the parsed set especially due to the known nature of the business (stock trading company), which the customer called. Synonymous relationships may be created and stored in a knowledge base (not shown) that is accessible to search engine 73 or to needs expression engine 71.

Results optimizer 75 reads the agent/system identification and internal routing parameters associated with the best match of a needs expression to a capabilities expression and sends a routing command to either router 31 or switch 25 (from FIG. 1).

Router/Switch (31, 25) then routes the event to a target agent or system. In this example, a customer wishing to check his or her portfolio was routed to an available and licensed stock trader and portfolio organizer as illustrated by the arrow labeled Agent/System leaving router/switch (31, 25).

In still another embodiment, a reporting feature may be provided in a target agent's desktop or in a supervisor's agent monitoring application (known to the inventor) that reports the measure of success (satisfaction of customer) of the transpiring interaction back to SW 69. Software 69 may then cause the needs expression of the target caller to be stored in NETI repository 39 of FIG. 1. In this way, a search may be automatically refined by first comparing new needs expressions to stored ones that resulted in successful interaction before searching CETI 37. There are many possibilities.

It will be apparent to one with skill in the art that the method and apparatus of the present invention may be successfully integrated with existing routing systems that use standard call origination and destination protocols as well as line and customer identification techniques for routing purposes without departing from the spirit and scope of the present invention. WAP users may benefit by having authenticated identifications, which may be linked to detailed customer profiles. Such profiles may be parsed for additional keywords not included in an initial request to further enhance a search for a best matching agent.

In one embodiment, the method and apparatus of the present invention may be applied to a personal router or service used by one individual having a plurality of possible destination numbers. In this case, a needs expression solicited from a caller may include parameters that, depending on content, would match one of individual capabilities expressions that are set-up for each of the possible destinations. In this embodiment, additional logic such as time of day, day of the week, time of year, etc. may be added to a needs expression to further enhance the possibility of a first routing that is successful (agent available at that destination).

The method and apparatus of the present invention may be practiced on any type of telecommunications network or system including combinations of disparate systems without departing from the spirit and scope of the present invention. Therefore the method and apparatus of the present invention should be afforded the broadest scope under examination. The spirit and scope of the present invention is limited only by the following claims.

What is claimed is:

1. A computerized routing system for routing communications events to final destinations comprising;

a communications routing apparatus for receiving and routing the communications events;

a system-client interface for accepting input from the communications events upon arrival of the events to the communications routing apparatus, and translation of the input into a needs expression (NE);

a data repository for storing a capability expression (CE) for at least one communications agent; and a software application for performing a fuzzy logic match between NE and CE, and for determining routing destinations for the communications events based on the results of the match.

2. The computerized routing system of claim 1 wherein at least one of the communications events is a telephone call, at least one of the communications agents is a service representative, and the routing apparatus is a telephony switch.

3. The computerized routing system of claim 2 wherein the routing takes place within a telephony communications center.

4. The computerized routing system of claim 1 wherein at least one of the communications events is an IP voice call, at least one of the communications agents is a service representative, and the routing apparatus is an IP data router.

5. The computerized routing system of claim 4 wherein the medium of communication is a wireless data network.

6. The computerized routing system of claim 1 wherein the routing apparatus is a personal router serving one communications agent having multiple destination numbers.

7. The computerized routing system of claim 6 wherein the routing apparatus is part of a telephony service subscribed to by the communications agent.

8. The computerized routing system of claim 6 wherein the routing apparatus is an IP data router.

9. A software application for determining routing destinations for communications events comprising;

a parsing module for parsing input from a communications event, producing a parsed result;

a data-search module for searching a data repository for agent characteristics matching the parsed result; and an optimization module for optimizing the results of the data search and selecting a routing destination from the optimized data.

10. The software application of claim 9 wherein the input is solicited through an interactive voice response capability.

11. The software application of claim 10 wherein the interactive voice response capability is additionally enhanced with voice recognition capability.

12. The software application of claim 9 wherein the communications events are text based and the parsing module parses text from the events.

13. The software application of claim 9 wherein the communications events are voice calls and the parsing module parses keywords and phrases from solicited voice input.

14. The software application of claim 9 wherein the optimization module optimizes the data according to data-match percentage values.

15. The software application of claim 9 wherein the data-search module searches more than one designated data repository.

16. A method for routing communications events to communications agents comprising the steps of;

(a) obtaining input data from the communications events;

(b) parsing the obtained data for keywords and phrases;

(c) performing a data search of agent characteristics using the parsed keywords and phrases;

(d) optimizing data returned in the search;

(e) determining a routing destination from the optimized data; and (f) routing the communications events to the selected routing destination.

17. The method of claim 16 wherein in step (a), the input data is solicited voice data.

18. The method of claim 16 wherein in step (a), the input data is text-based data.

19. The method of claim 16 wherein in step (c), more than one data repository is searched.

20. The method of claim 16 wherein in step (d), data optimization involves ranking the data according to data-match percentage values.

21. The method of claim 16 wherein in step (f), the communications events are routed by a telephony switch.

22. The method of claim 16 wherein in step (f), the communications events are routed by an IP data router.

* * * * *